G. DUNN.
DYNAMO ELECTRIC MACHINE FRAME.
APPLICATION FILED APR. 19, 1910.

1,104,784.

Patented July 28, 1914.
3 SHEETS—SHEET 1.

Witnesses:
Samuel W. Balch
Frank C. Cole

Inventor,
Gano Dunn,
by Thomas Ewing Jr.,
Attorney

G. DUNN.
DYNAMO ELECTRIC MACHINE FRAME.
APPLICATION FILED APR. 19, 1910.

1,104,784.

Patented July 28, 1914.

3 SHEETS—SHEET 2.

Witnesses:
Samuel W. Balch
James Dew

Inventor,
Gano Dunn
by Thomas Ewing Jr
Attorney.

G. DUNN.
DYNAMO ELECTRIC MACHINE FRAME.
APPLICATION FILED APR. 19, 1910.

1,104,784.

Patented July 28, 1914.

3 SHEETS—SHEET 3.

Witnesses:
Samuel W. Balch
Frank C. Cole

Inventor,
Gano Dunn,
by Thomas Ewing Jr.
Attorney

UNITED STATES PATENT OFFICE.

GANO DUNN, OF EAST ORANGE, NEW JERSEY, ASSIGNOR TO CROCKER-WHEELER COMPANY, OF AMPERE, NEW JERSEY, A CORPORATION OF NEW JERSEY.

DYNAMO-ELECTRIC-MACHINE FRAME.

1,104,784.      Specification of Letters Patent.      Patented July 28, 1914.

Application filed April 19, 1910. Serial No. 556,358.

*To all whom it may concern:*

Be it known that I, GANO DUNN, a citizen of the United States of America, and a resident of East Orange, county of Essex, and State of New Jersey, have invented certain new and useful Improvements in Dynamo-Electric-Machine Frames, of which the following is a specification.

The object of this invention is to provide a centering means which will enable the rotor of a dynamo-electric machine to be accurately centered with respect to the stator, thereby compensating for any want of truth arising in the original machining of the parts, springing or set of the parts, or displacement occasioned by wear of the bearings. A narrower air gap thereby becomes permissible with consequent increased efficiency and duty.

Figure 1:
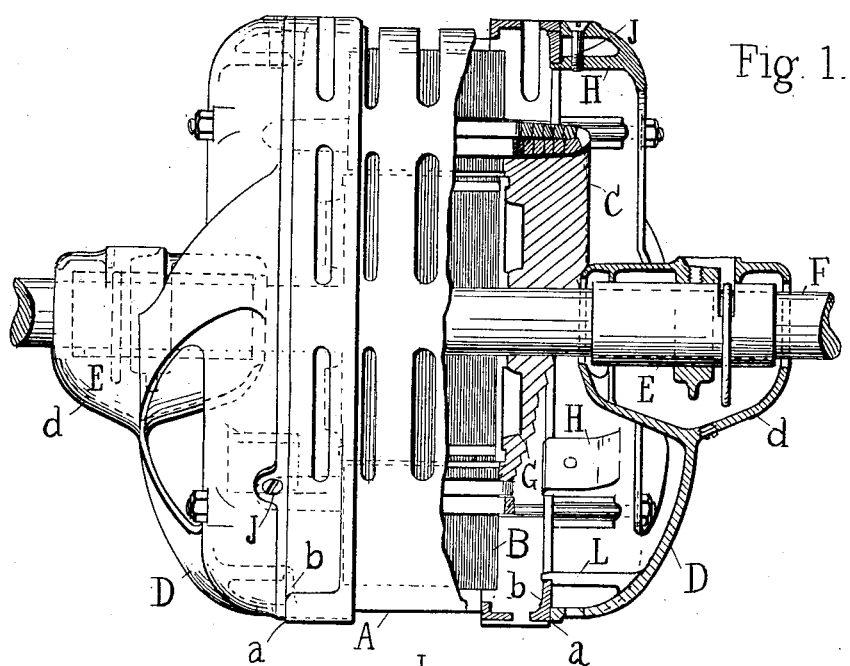
Figure 2:
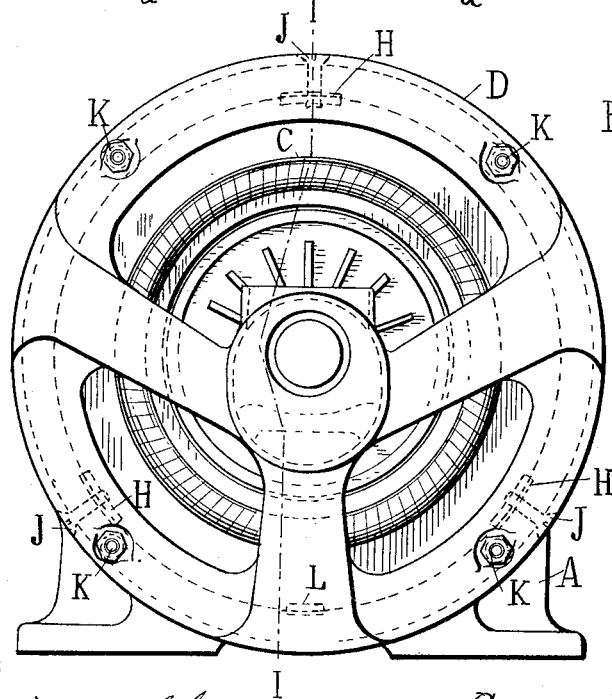
Figure 3:
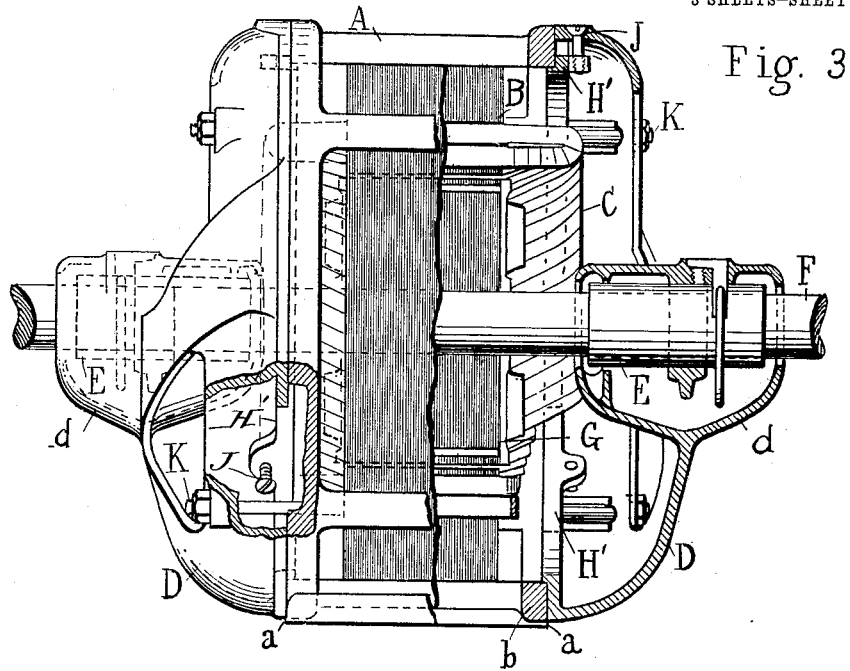
Figure 4:
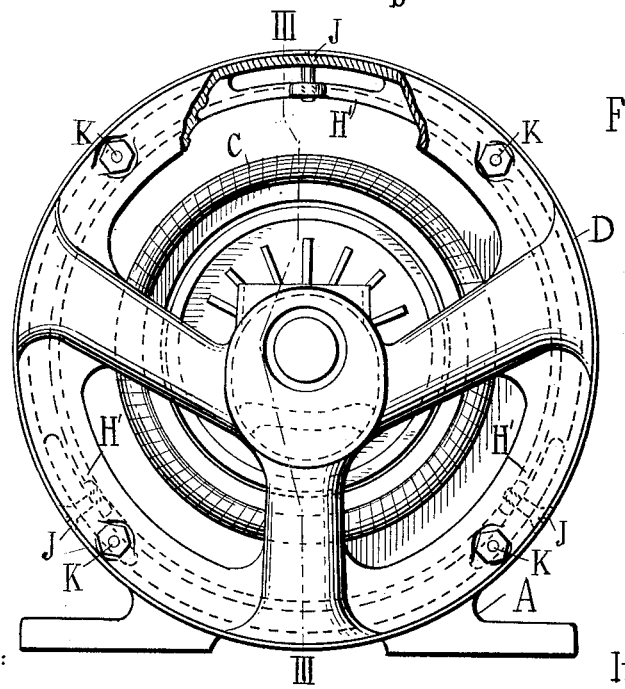
Figure 5:
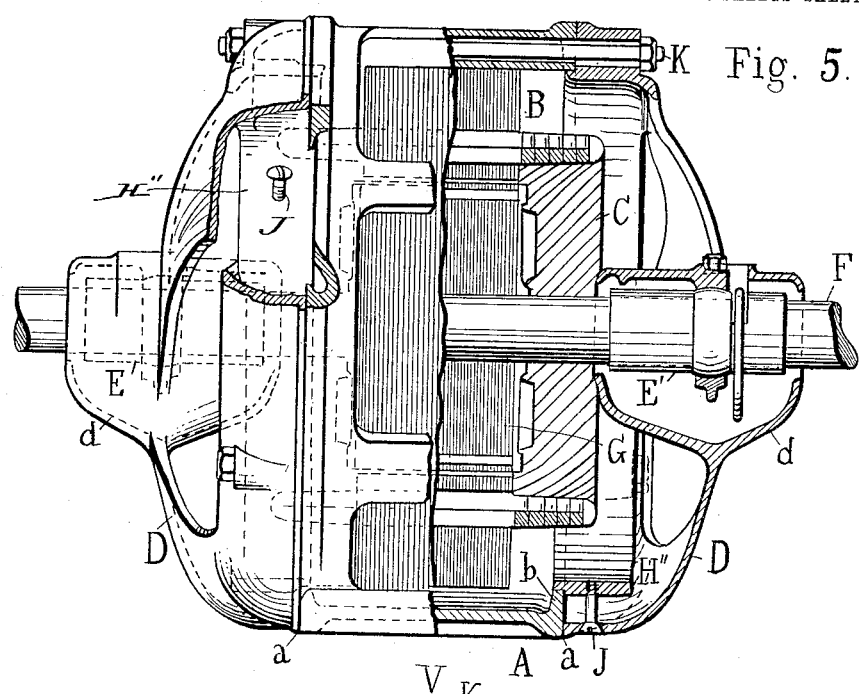
Figure 6:
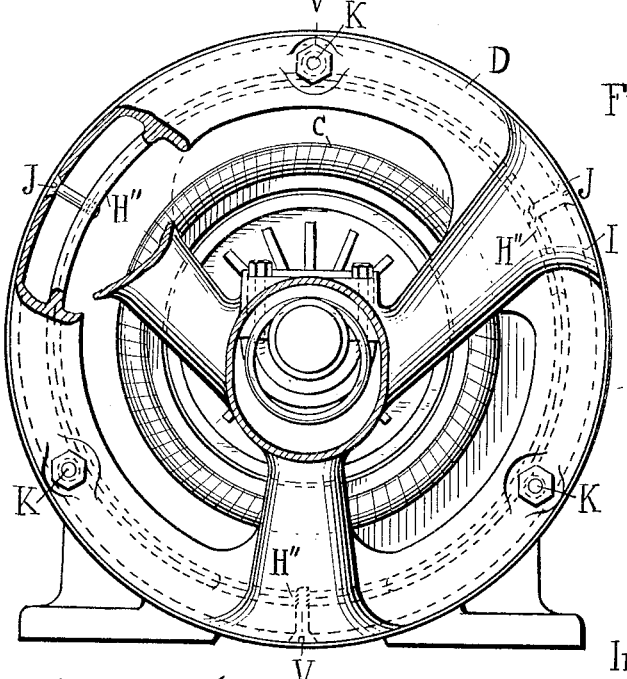

In the accompanying three sheets of drawings which form a part of this application—Figure 1 shows an induction motor embodying my invention, the left end being in elevation and the right end being in vertical longitudinal section on the line I—I of Fig. 2. Fig. 2 is an end elevation of the same. Fig. 3 shows an induction motor embodying a modified form of my invention, the left end being in elevation with a portion of the shield broken away and the right end being in vertical longitudinal section on the line III—III of Fig. 4. Fig. 4 is an end elevation of the same with the rim of the shield broken away. Fig. 5 shows an induction motor embodying another modified form of my invention, the left end being in elevation with a portion of the shield broken away and the right end being in vertical longitudinal section on the line V—V of Fig. 6. Fig. 6 is an end elevation of the same with the rim of the shield broken away and the bearing in section.

In the form shown in Figs. 1 and 2, a stator frame A, which is conveniently a casting, has its ends $a$ $a$ faced plane and parallel and the interior edges of its interiorly flanged rims $b$ $b$ also finished in a lathe or boring mill. This frame rigidly supports a laminated iron ring B which carries windings C laid in slots in the ring. End shields D D, also castings, carry bearings $d$ $d$ suitably bushed with bushes E E for the support of a shaft F which carries a rotor G. These end shields are faced plane to lie against the faced ends of the stator frame. The rim of each shield is concave and within the concave there are three elastic centering portions H H H in the form of lugs cast to the rim and springing at points equidistant from the center and spaced at about equal angular distances from each other around the shield. These lugs are of such cross sections and lengths that they will have a perceptible degree of elasticity so that their ends may be sprung out of place to the extent to which adjustment may be required. The ends of the lugs project slightly beyond the shield face and their outwardly facing sides are finished in a lathe concentric to the bearing to properly engage the interior of the rim of the stator frame. Draw-screws J J J pass through the rim and tap into the centering lugs and serve as a means for springing the lugs to effect the proper centering. Bolts K K clamp and thereby secure the end shields to the stator frame. A lug L is provided opposite one of the lugs H for convenience in calipering when finishing the lugs, but this latter lug is not used in centering. As displacement of either end shield in effecting the adjustment angularly deflects the shaft to a slight extent, it is desirable that the bearings should be to the same extent self-alining, but, as this adjustment is toward the center, this self-alining feature is sufficiently introduced by supporting the bush in a narrow collar in which the bush is only an easy fit.

It is not essential to my invention that the portion which engages the other element of the frame from the one on which it is cast, and which is sprung out of place to effect the centering, should be the end of a lug, and in the form shown in Figs. 3 and 4, a flange projects inwardly from the rim of the shield and is slotted at three points, thereby forming elastic centering portions H′ H′ H′ bridging between the more rigidly connected portions of this flange. The draw-screws J J J tap into the middle points of these elastic centering portions.

In the form shown in Figs. 5 and 6 a ring lies within the concave of the shield and joins thereto except at three points where it forms elastic centering portions H″ H″ H″ bridging between the more rigidly connected portions of this ring. The draw-screws J J J tap into the middle points of these elastic centering portions. In this form the bush E' is formed with a ball which is supported in a socket in the hub of the end shield for the necessary self-alinement.

What I claim as new, and desire to secure by Letters Patent of the United States, is—

1. In a dynamo-electric machine, the combination of a rotor, inclosing means consisting of a stator frame with faced ends and faced end shields provided with bearings for the rotor, one of the inclosing parts having rigidly attached elastic centering portions engaging the other part, means for springing the centering portions, and means for clamping together the parts of the inclosing means, substantially as described.

2. In a dynamo-electric machine, the combination of a rotor, a stator frame with faced ends, faced end shields provided with bearings for the rotor and elastic centering portions rigidly attached thereto and engaging the stator frame, means for springing the centering portions and means for clamping the end shields to the stator frame, substantially as described.

3. In a dynamo-electric machine, the combination of a rotor, a stator frame with faced ends, faced end shields provided with bearings for the rotor and elastic centering portions rigidly attached thereto and having outwardly facing bearing points in engagement with the interior of the stator frame, means for springing the centering portions, and means for clamping the end shields to the stator frame, substantially as described.

4. In a dynamo-electric machine, the combination of a rotor, a stator frame with faced ends, faced end shields provided with bearings for the rotor and elastic centering lugs rigidly attached thereto and engaging the stator frame, means for springing the centering lugs and means for clamping the end shields to the stator frame, substantially as described.

5. In a dynamo-electric machine, the combination of a rotor, a stator frame with faced ends, faced end shields provided with bearings for the rotor and elastic centering lugs rigidly attached thereto and having outwardly facing bearing points in engagement with the interior of the stator frame, means for springing the centering lugs and means for clamping the end shields to the stator frame, substantially as described.

6. In a dynamo-electric machine, the combination of a rotor, a stator frame with faced ends, faced end shields provided with bearings for the rotor and elastic centering lugs rigidly attached thereto and having outwardly facing bearing points in engagement with the interior of the stator frame, draw-screws passing through the end shields and tapping into the centering lugs for springing them, and means for clamping the end shields to the stator frame, substantially as described.

7. In a dynamo-electric machine, inclosing means consisting of a stator frame with faced ends and faced end shields provided with bearings for the rotor, one of the inclosing parts having rigidly attached elastic centering portions engaging the other part, means for springing the centering portions, and means for clamping together the parts of the inclosing means, substantially as described.

8. In a dynamo-electric machine, a stator frame with faced ends, faced end shields provided with bearings for the rotor and elastic centering portions rigidly attached thereto and engaging the stator frame, means for springing the centering portions and means for clamping the end shields to the stator frame, substantially as described.

9. In a dynamo-electric machine, a stator frame with faced ends, faced end shields provided with bearings for the rotor and elastic centering portions rigidly attached thereto and having outwardly facing bearing points in engagement with the interior of the stator frame, means for springing the centering portions, and means for clamping the end shields to the stator frame, substantially as described.

Signed at East Orange, N. J., this 16th day of April, 1910.

GANO DUNN.

Witnesses:
J. MACDONALD SMITH,
H. C. HARRISON.